(12) United States Patent
Lang et al.

(10) Patent No.: US 8,221,593 B2
(45) Date of Patent: Jul. 17, 2012

(54) REACTOR, PLANT AND INDUSTRIAL PROCESS FOR THE CONTINUOUS PREPARATION OF HIGH-PURITY SILICON TETRACHLORIDE OR HIGH-PURITY GERMANIUM TETRACHLORIDE

(75) Inventors: Juergen Erwin Lang, Karlsruhe (DE); Rainer Nicolai, Basel (SE); Hartwig Rauleder, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 1084 days.

(21) Appl. No.: 12/065,126

(22) PCT Filed: Jun. 6, 2006

(86) PCT No.: PCT/EP2006/062916
§ 371 (c)(1),
(2), (4) Date: Feb. 28, 2008

(87) PCT Pub. No.: WO2007/025787
PCT Pub. Date: Mar. 8, 2007

(65) Prior Publication Data
US 2008/0197014 A1     Aug. 21, 2008

(30) Foreign Application Priority Data
Aug. 30, 2005    (DE) .......................... 10 2005 041 137

(51) Int. Cl.
*H05F 3/04*    (2006.01)
(52) U.S. Cl. ........................................ 204/164; 423/324
(58) Field of Classification Search .................. 204/164, 204/165, 168, 169, 170, 178; 422/186.04, 422/186.07, 186.12, 186.21; 423/240 R, 423/245.1, 245.3, 324, 341, 342, 466
See application file for complete search history.

(56) References Cited

U.S. PATENT DOCUMENTS

| | | | |
|---|---|---|---|
| 4,372,834 A | 2/1983 | Barns et al. | |
| 4,923,687 A | 5/1990 | Schork et al. | |
| 5,026,533 A | 6/1991 | Matthes et al. | |
| 5,616,755 A | 4/1997 | Seiler et al. | |
| 5,654,459 A | 8/1997 | Kropfgans et al. | |
| 5,698,726 A | 12/1997 | Rauleder et al. | |
| 5,852,206 A | 12/1998 | Horn et al. | |
| 6,100,418 A | 8/2000 | Standke et al. | |
| 6,142,024 A | 11/2000 | Rauleder et al. | |
| 6,150,551 A | 11/2000 | Kropfgans et al. | |
| 6,177,584 B1 | 1/2001 | Loewenberg et al. | |
| 6,222,056 B1 | 4/2001 | Bade et al. | |
| 6,291,698 B1 | 9/2001 | Bade et al. | |
| 6,372,190 B1 | 4/2002 | Zehe et al. | |
| 6,585,941 B2 | 7/2003 | Zehe et al. | |
| 6,680,038 B2 | 1/2004 | Rauleder et al. | |
| 6,727,375 B2 | 4/2004 | Steding et al. | |
| 7,204,963 B2 | 4/2007 | Rauleder et al. | |
| 7,410,914 B2 | 8/2008 | Kuehnle et al. | |
| 7,507,850 B2 | 3/2009 | Muh et al. | |
| 8,002,954 B2 * | 8/2011 | Popp et al. | ..................... 204/164 |
| 8,038,961 B2 | 10/2011 | Sonnenschein et al. | |
| 2008/0283972 A1 | 11/2008 | Muh et al. | |
| 2008/0289690 A1 | 11/2008 | Sonnenschein et al. | |
| 2009/0259063 A1 | 10/2009 | Lang et al. | |
| 2010/0296994 A1 | 11/2010 | Rauleder et al. | |

FOREIGN PATENT DOCUMENTS

| | | |
|---|---|---|
| EP | 1 085 075 | 3/2001 |
| JP | 06 168910 | 6/1994 |
| JP | 08 130210 | 5/1996 |
| WO | 99 13973 | 3/1999 |
| WO | 03 010088 | 2/2003 |
| WO | 2006 013129 | 2/2006 |

OTHER PUBLICATIONS

U.S. Appl. No. 11/659,084, filed Feb. 1, 2007, Popp, et al.
U.S. Appl. No. 12/999,240, filed Dec. 15, 2010, Seliger, et al.
U.S. Appl. No. 13/059,692, filed Feb. 18, 2011, Lang, et al.
U.S. Appl. No. 13/121,756, filed Mar. 30, 2011, Lang, et al.
U.S. Appl. No. 61/110,827, filed Nov. 3, 2008, Rauleder, et al.
U.S. Appl. No. 13/121,761, filed Mar. 30, 2011, Rauleder, et al.
U.S. Appl. No. 13/121,758, filed Mar. 30, 2011, Lang, et al.
U.S. Appl. No. 61/111,127, filed Nov. 4, 2008, Panz.
U.S. Appl. No. 13/121,754, filed Mar. 30, 2011, Panz, et al.
U.S. Appl. No. 61/111,125, filed Nov. 4, 2008, Panz.
U.S. Appl. No. 13/121,751, filed Mar. 30, 2011, Panz, et al.
U.S. Appl. No. 61/110,828, filed Nov. 3, 2008, Rauleder, et al.
U.S. Appl. No. 13/121,759, filed Mar. 30, 2011, Rauleder, et al.
U.S. Appl. No. 61/112,891, filed Nov. 10, 2008, Lang, et al.
U.S. Appl. No. 13/128,442, filed May 10, 2011, Lang, et al.
U.S. Appl. No. 13/121,702, filed Mar. 30, 2011, Rauleder, et al.
U.S. Appl. No. 12/811,925, filed Jul. 7, 2010, Mueh, et al.
U.S. Appl. No. 12/738,799, filed Jul. 13, 2010, Rauleder, et al.
U.S. Appl. No. 12/812,857, filed Jul. 14, 2010, Mueh, et al.
U.S. Appl. No. 12/681,114, filed Apr. 1, 2010, Mueh, et al.
U.S. Appl. No. 12/524,371, filed Jul. 24, 2009, Lang, et al.
U.S. Appl. No. 12/528,087, filed Aug. 21, 2009, Schwarz, et al.
U.S. Appl. No. 12/738,246, filed Apr. 15, 2010, Rauleder, et al.
U.S. Appl. No. 13/383,965, filed Jan. 13, 2012, Rauleder, et al.
U.S. Appl. No. 13/383,681, filed Jan. 12, 2012, Mueh et al.

* cited by examiner

*Primary Examiner* — Yelena G Gakh
*Assistant Examiner* — Christopher A Hixson
(74) *Attorney, Agent, or Firm* — Oblon, Spivak, McClelland, Maier & Neustadt, L.L.P.

(57) ABSTRACT

A reactor, a plant, and a continuous, industrial process carried out therein for preparing high-purity silicon tetrachloride or high-purity germanium tetrachloride by treating the silicon tetrachloride or germanium tetrachloride to be purified, which is contaminated by at least one hydrogen-containing compound, by a cold plasma and isolating purified high-purity silicon tetrachloride or germanium tetrachloride from the resulting treated phase by fractional distillation. The treatment is carried out in a plasma reactor in which longitudinal axes of a dielectric, of a high-voltage electrode, and of a grounded, metallic heat exchanger are oriented parallel to one another and at the same time parallel to the force vector of gravity.

17 Claims, 2 Drawing Sheets

REACTOR, PLANT AND INDUSTRIAL PROCESS FOR THE CONTINUOUS PREPARATION OF HIGH-PURITY SILICON TETRACHLORIDE OR HIGH-PURITY GERMANIUM TETRACHLORIDE

CROSS REFERENCE TO RELATED APPLICATIONS

This application is the National Stage of PCT/EP06/62916, filed Jun. 6, 2006, the disclosure of which is incorporated herein by reference in its entirety. The parent application claims priority to German Application No. 10 2005 041 137.1 files Aug. 30, 2005, the disclosure of which is incorporated herein by reference in its entirety.

BACKGROUND OF THE INVENTION

The present invention relates to a continuous process, a plant and a reactor for the preparation of high-purity silicon tetrachloride or high-purity germanium tetrachloride by treatment of the silicon tetrachloride or germanium tetrachloride to be purified, which is contaminated with at least one hydrogen-containing compound, by means of a cold plasma and subsequent fractional distillation of the treated phase.

Silicon tetrachloride ($SiCl_4$) and germanium tetrachloride ($GeCl_4$) are used, inter alia, for producing optical fibres. For these applications, $SiCl_4$ having a very high purity is required. Efforts are likewise made to prepare germanium tetrachloride in very pure, in particular high-purity, form.

Here, hydrogen-containing compounds are a considerable disadvantage, even if they are present in only ppm amounts. However, silicon tetrachloride frequently contains hydrogen-containing trace components or secondary components, e.g. HCl, —Si—OH-containing species, —C—H-containing species and Si—H-containing species. An analogous situation applies to $GeCl_4$.

In the case of hydrogen-containing impurities in silicon tetrachloride, a distinction has to be made between impurities which are difficult to separate off and those which are easy to separate off. HCl, for example, can be separated from silicon tetrachloride down to the region of <1 ppm by weight by simple fractional distillation. On the other hand, hydrocarbons in particular but also chlorinated hydrocarbons and possibly corresponding compounds such as silanes bearing alkyl groups cannot be separated off down to the region of <1 ppm by weight by simple fractional distillation.

Possible ways of removing hydrocarbons, chlorinated hydrocarbons and corresponding compounds such as silanes bearing alkyl groups from silicon tetrachloride have been known for a long time.

Thus, silicon tetrachloride containing the abovementioned components can, according to U.S. Pat. No. 4,372,834 and EP 0 488 765 A1, be treated in the presence of chlorine with UV radiation in the wavelength range from 200 to 380 nm and the chlorination products obtained can subsequently be separated from $SiCl_4$ by fine distillation. A substantial disadvantage of this process is that the plant components come into contact with chlorine gas, which is added in considerable amounts according to EP 0 488 765 A1, and are thus subjected to particularly severe corrosion, which inevitably leads to frequent shutdowns of the plant. In addition, the chlorine to be added likewise has to meet very high purity requirements. Both result in high operating costs for the plant. A further particular disadvantage is the particularly poor energy efficiency of UV radiation sources proposed, for example, by EP 0 488 765 A1. This results in particularly long treatment times, which likewise leads to high costs.

A general process for purifying halogen compounds and hydrogen compounds of silicon is likewise known (DE-B 10 58 482). Thus, chlorosilanes and bromosilanes can be treated by addition of a reducing agent such as hydrogen, silicon, sodium, aluminum or zinc under the action of a gas discharge, in particular a dark gas discharge, forming, as a result of free radical formation and combination of free radicals, relatively high molecular weight compounds in which the elements carbon, boron or phosphorus can be incorporated in relatively high molecular weight compounds of chlorosilicon and which are separated off by distillation. A particular disadvantage of this process is the fact that a reducing agent has to be added. In particular, DE-B 10 58 482 teaches the addition of hydrogen as reducing agent in the purification of an $SiCl_4$ fraction.

Plasma technology has a special place in the generation of ozone from oxygen or air in an ozonizer (EP 0560 166 A1, WO 89/12021, WO 97/09268, WO 01/07360, WO 02/096798, WO 04/046028).

The earlier German patent application 10 2004 037 675.1 teaches a continuous process for the preparation of high-purity silicon tetrachloride or high-purity germanium tetrachloride by treatment of silicon tetrachloride or germanium tetrachloride contaminated with at least one hydrogen-containing compound by means of a cold plasma and subsequent fractional distillation of the phase which has been treated in this way. A cold plasma can in principle also be generated using ozonizer systems. However, reactor systems for producing high-purity silicon tetrachloride or germanium tetrachloride generally require the use of spacers for fixing a precise distance between the electrodes and the dielectric. Furthermore, suitable spacers are only moderately resistant to $SiCl_4$ or $GeCl_4$.

SUMMARY OF THE INVENTION

It is an object of the present invention to provide a further possible way of carrying out a continuous process for the preparation of high-purity silicon tetrachloride or high-purity germanium tetrachloride by treatment of the silicon tetrachloride or germanium tetrachloride to be purified by means of a cold plasma on an industrial scale.

In the following, silicon tetrachloride or germanium tetrachloride will also be referred to as tetrahalides for short.

The nominated object is achieved according to the invention as described in the claims.

DETAILED DESCRIPTION OF THE PREFERRED EMBODIMENTS

It has surprisingly been found that the continuous process for the preparation of high-purity silicon tetrachloride or high-purity germanium tetrachloride by treatment of silicon tetrachloride or germanium tetrachloride which is contaminated by at least one hydrogen-containing compound with a cold plasma can be carried out advantageously and reliably on an industrial scale in a comparatively simple and economical manner using a novel reactor system, a plasma reactor for gas-phase treatment (PRG for short) and subsequent fractional distillation of the phase which has been treated in this way, with such a reactor advantageously having the dielectrics present in the PRG arranged in a mechanically self-stabilizing fashion, which is achieved by parallel arrangement of the generally tubular dielectrics relative to one another and direction of their longitudinal axes parallel to the force of gravity.

In addition, a high aspect ratio (gap for short), i.e. aspect ratio=tube length/charge spacing, with an extremely high homogeneity and thus a high constancy of the gap over the length of the dielectric ("tube length") can advantageously be achieved. In this way, the spacers customary for ozonizers can be omitted in an advantageous fashion on the basis of the teachings of the invention.

Figure 2:
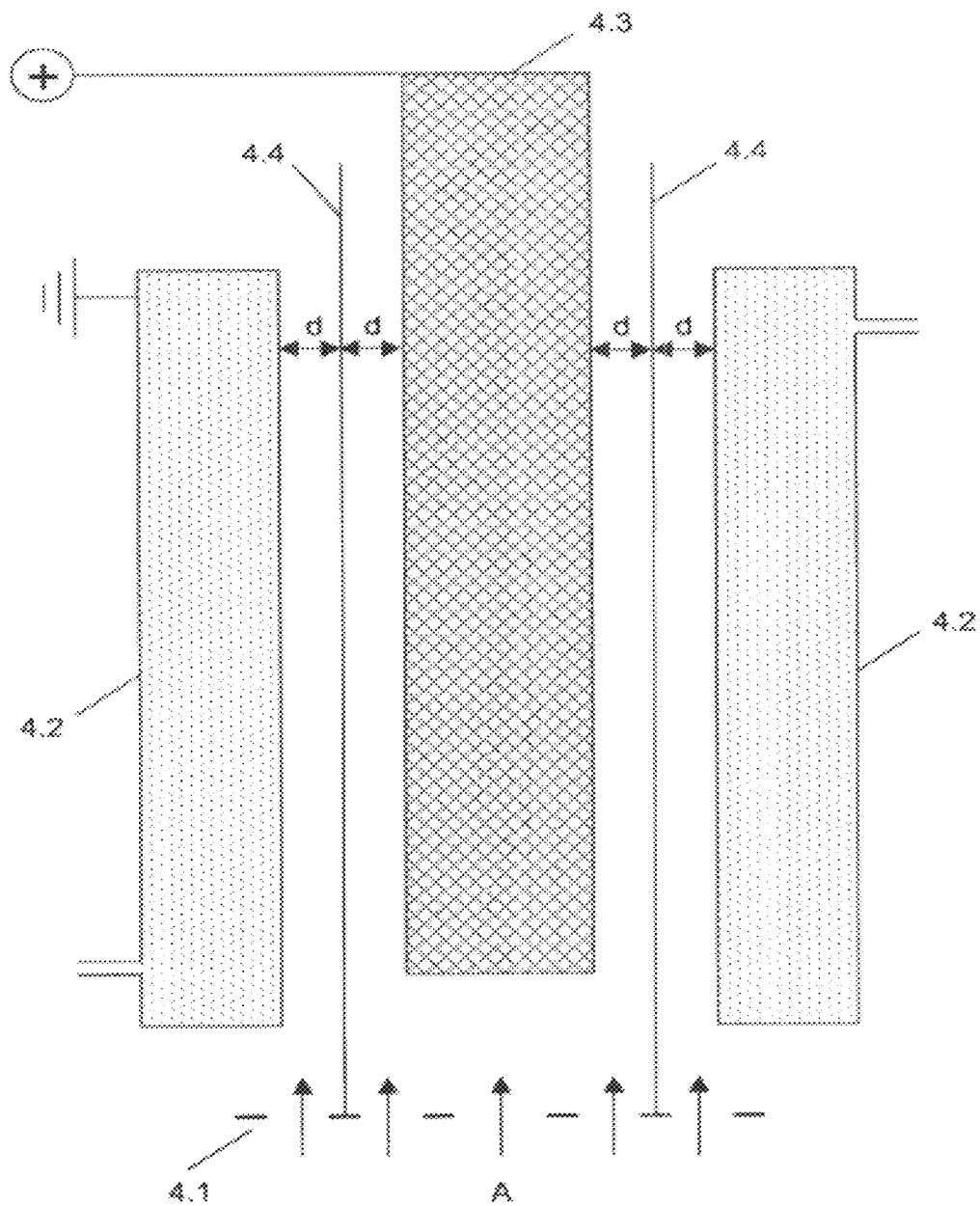
FIG. 2 shows a micro unit of a plasma reactor for gas phase treatment according to an embodiment of the invention.

Furthermore, the phase to be treated (A) can appropriately be fed into the plasma or reaction region in the present PRG at the earth end, which contributes to stabilization of the reactor arrangement, cf. FIG. 2.

Thus, a plant of the present type makes it possible for industrial treatment and purification of silicon tetrachloride or germanium tetrachloride phases by means of a cold plasma to be carried out in a surprisingly simple and economical way. In addition, such an industrial plant can be operated safely and reliably using the present process.

To monitor the effectiveness of the present process, methyltrichlorosilane (MTCS), in particular, can be used as guide parameter.

Thus, an $SiCl_4$ grade according to the invention advantageously contains less than 1 ppm by weight of MTCS, with the analytical detection limit of MTCS in $SiCl_4$ being 0.2 ppm by weight. The determination of MTCS can be carried out by means of FT-IR or 1 H-NMR methods.

Furthermore, it has surprisingly been found that the procedure described above for silicon tetrachloride can also be used for the purification of germanium tetrachloride.

Figure 1:
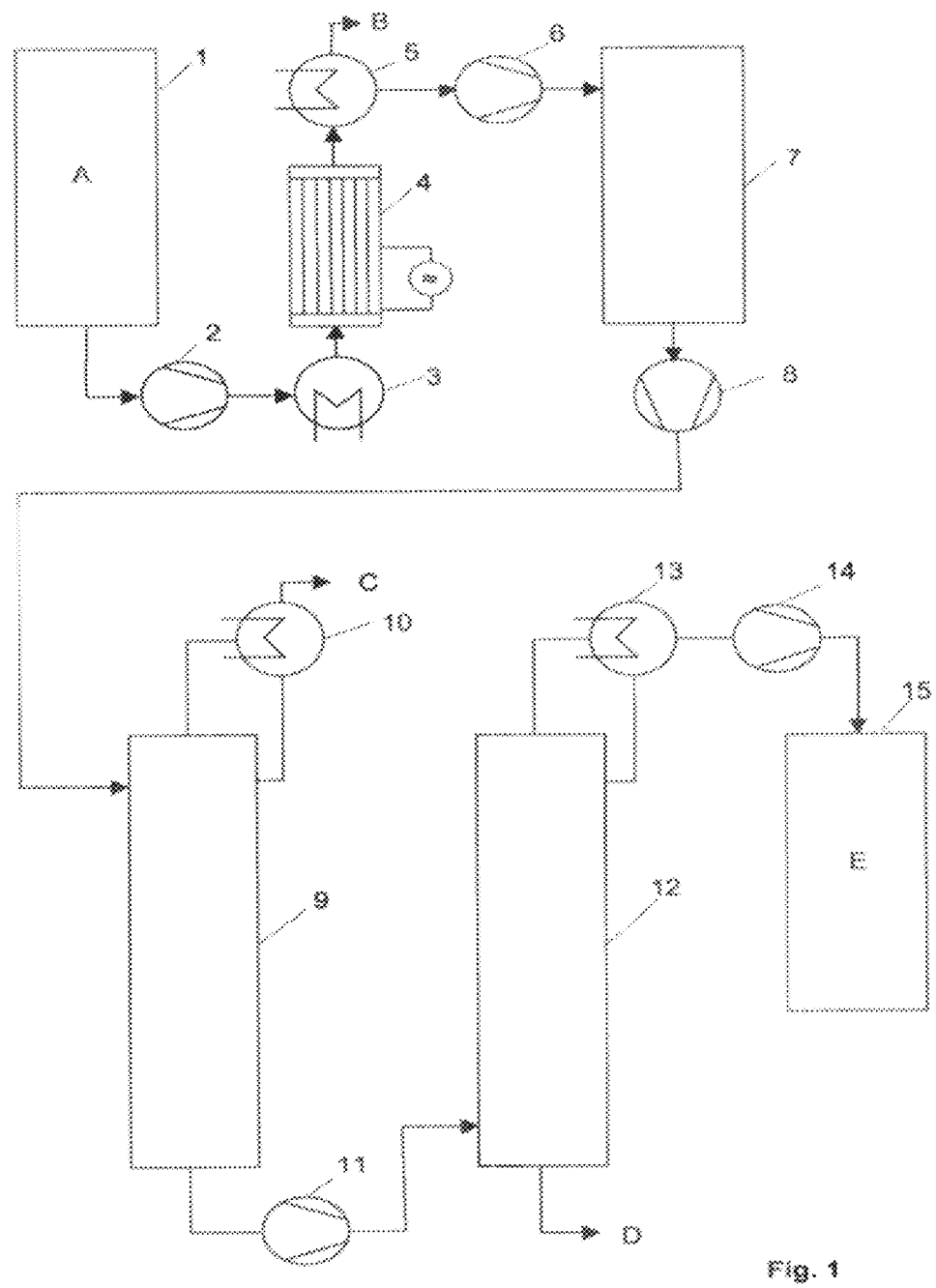
FIG. 1 shows a schematic diagram of a plant according to one embodiment of the invention.

FIGS. 1 and 2 show, by way of example, a preferred embodiment of a plant according to the invention or a PRG and also a micro unit of a PRG according to the invention.

FIG. 1 shows the flow diagram of a preferred plant for carrying out the process of the invention:

A starting material to be treated
B hydrogen chloride gas
C low boilers
D high boilers
E product stream
1 storage vessel (heatable, coolable)
2 transport unit
3 vaporizer
4 plasma reactor for gas-phase treatment (PRG)
5 condenser
6 transport unit
7 intermediate vessel
8 transport unit
9 distillation column (heatable)
10 low boiler removal
11 transport unit
12 distillation column for separating off high boilers
13 condenser
14 transport unit
15 product container The present invention accordingly provides a reactor for the treatment of silicon tetrachloride or germanium tetrachloride which is contaminated by at least one hydrogen-containing compound by means of a cold plasma, wherein the plasma reactor (4) is based on a reactor housing, a high-voltage supply and at least one micro unit for the plasma treatment which consists essentially of an earthed, metallic heat exchanger (4.2), a dielectric (4.4), a perforated plate, a grid or a mesh (4.1) and a high-voltage electrode (4.3) and the longitudinal axes of the dielectric (4.4), of the high-voltage electrode (4.3) and of the earthed, metallic heat exchanger (4.2) are oriented parallel to one another and at the same time parallel to the direction vector of the force of gravity.

The present invention further provides a plant for the preparation of high-purity silicon tetrachloride or high-purity germanium tetrachloride in a reactor system (1, 2, 3, 4, 5, 6, 7, 8) by means of a cold plasma and a subsequent distillation unit (9, 10, 11, 12, 13, 14, 15) for the work-up of the treated phase, wherein the plasma reactor (4) (PRG for short) is based on a reactor housing, a high-voltage supply and at least one micro unit for the plasma treatment which consists essentially of an earthed, metallic heat exchanger (4.2), a dielectric (4.4), a perforated plate, a grid or a mesh (4.1) and a high-voltage electrode (4.3) and the longitudinal axes of the dielectric (4.4), of the high-voltage electrode (4.3) and of the earthed, metallic heat exchanger (4.2) are oriented parallel to one another and at the same time parallel to the direction vector of the force of gravity.

Preference is here given to a tubular dielectric (4.4) being oriented on a perforated plate, a grid or a mesh (4.1), with the dielectric (4.4) being surrounded by a tubular heat exchanger (4.2) and a rod electrode or a tubular mesh electrode (4.3) projecting completely or partly into the tube (4.4), cf. FIG. 2.

Furthermore, preference is given to the dielectric (4.4) being a tube having a wall thickness from 0.1 to 10 mm, preferably from 0.5 to 2 mm, in particular about 1 mm, an internal diameter from 1 to 300 mm, preferably from 5 to 30 mm, in particular about 10 mm, and a length from 10 to 3 000 mm, preferably from 500 to 2 000 mm, in particular from 1 000 to 1 500 mm, and comprising quartz glass, Duran glass, borosilicate glass or aluminum oxide.

In addition, the surface of the dielectric can be structured, in particular in order to maximize the geometric surface area of the dielectric.

In a PRG according to the invention, the electrode (4.3) is advantageously made of metal or a metal alloy and may be coolable.

Preference is also given to the respective shortest open spacing (d) between a dielectric (4.4) and the high-voltage electrode (4.3) and between the dielectric (4.4) and the tubular heat exchanger (4.2) being identical, cf. FIG. 2.

Particular preference is given to the spacing (d) being from 0.01 to 100 mm, particularly preferably from 0.1 to 10 mm, very particularly preferably from 0.3 to 1 mm.

In a plant according to the invention, the perforated plate, the grid or the mesh (4.1) in the PRG appropriately have a free cross-sectional area of from 10 to 90%, preferably from 20 to 80%, particularly preferably from 30 to 70%, very particularly preferably from 40 to 60%.

Furthermore, the heat exchanger (4.2) of the PRG can be both heatable and coolable and be configured as a shell-and-tube heat exchanger.

A plant according to the invention is preferably based on at least one PRG (4) which advantageously comprises from 2 to 50 000 micro units, particularly preferably from 20 to 10 000, very particularly preferably from 600 to 6 000, in particular from 1 000 to 4 000, micro units.

The present invention likewise provides a continuous, industrial process for preparing high-purity silicon tetrachloride or high-purity germanium tetrachloride by treating the silicon tetrachloride or germanium tetrachloride to be purified, which is contaminated by at least one hydrogen-containing compound, by means of a cold plasma and isolating purified silicon tetrachloride or germanium tetrachloride from the resulting treated phase by fractional distillation, wherein the treatment is carried out in a plasma reactor (4) in which the longitudinal axes of the dielectric (4.4), of the high-voltage electrode (4.3) and of the earthed, metallic heat exchanger (4.2) are oriented parallel to one another and at the same time parallel to the force vector of gravity.

According to the invention, preference is given to at least one micro unit per PRG (4) whose discharge space is preferably tubular and free of stands, with the longitudinal axis of a tube being oriented essentially parallel to the force vector of gravity, i.e. perpendicular to the earth's surface.

Preference is thus given in the process of the invention to the use of at least one plasma reactor for gas-phase treatment (4) whose tubular dielectrics (4.4) stand on a perforated plate, a grid or a mesh (4.1), with the phase to be treated (A) flowing through the perforated standing area (4.1) and subsequently passing through the reaction region between the dielectric (4.4) and the electrode (4.3 or 4.2).

However, two or more plasma reactors (4) can also be operated in series or in parallel.

Such tubes (4.4) of a preferred PRG (4) are generally based on quartz glass, Duran glass, borosilicate glass or aluminum oxide. A preferred PRG is usually operated using a pulsed alternating current.

Reactors (4) used in the process of the invention are preferably equipped with from 1 to 50 000 micro units which are oriented perpendicular to the earth's surface and are arranged parallel to one another.

The process of the invention is advantageously carried out using a cold plasma in the form of a dielectrically hindered discharge (DHD or silent discharge) which is advantageously generated in each micro unit of the PRG. The present invention thus also has the advantage that the present process can be carried out as microtechnology in microreactors, for example consisting of one micro unit, with a plurality of such micro reactors being able to be operated in parallel and/or in series.

Alternating current discharges having frequencies in the range from 1 to $10^9$ Hz, in particular from 10 to $10^6$ Hz, are preferred for the treatment of the abovementioned tetrahalides in the process of the invention. Here, pulsed barrier discharges or barrier discharges operated using an AC voltage are preferably used.

A barrier discharge can be generated between two metallic electrodes of which at least one is covered with a dielectric which prevents spark formation or arcing between the two metallic electrodes. Instead, many brief and spatially tightly limited microdischarges whose discharge time and quantity of energy are limited by the dielectric are formed. Suitable dielectrics are ceramics, glass, porcelain or insulating polymers, for example Teflon. Further suitable materials are described, for example, in VDE 0303 and DIN 40 685.

Barrier discharges can appropriately be operated at pressures of from 0.1 mbar to 10 bar. The electrical excitation of the discharge is effected by applying an alterable voltage to the electrodes. Depending on the pressure in the discharge space, the spacing of the electrodes, frequency and amplitude of the AC voltage, discharges which last only a few nanoseconds and are randomly distributed in space and over time are formed when an ignition voltage is exceeded.

The electrical excitation can be characterized as follows:

Application of an AC voltage to the two electrodes results in ignition of the desired discharge when the field strength in the discharge volume is high enough. The voltage required depends on the free spacing (d) between the dielectric and the counterelectrode, on the dielectric used and on the pressure in the discharge section, on the gas composition and on any internals present between the dielectrics in the discharge space (gap for short). The spacing (d) is appropriately set to from 0.01 to 100 mm, preferably from 0.1 to 10 mm, in particular from 0.3 to 1 mm. The voltages required can be from 10 V to 100 kV, preferably from 100 V to 15 kV, particularly preferably from 1 kV to 10 kV, in a micro system or a micro unit. The frequency of the AC voltage is advantageously in the range from 1 Hz to 30 GHz, preferably from 50 Hz to 250 MHz, in particular from 600 Hz to 2 kHz. Further emitter frequencies are explicitly not ruled out.

The PRG configured according to the invention can, however, also be filled with spheres or pellets for carrying out the present process. The electric discharge takes place first and foremost in the form of creeping discharges on the surface of the spheres or pellets, which preferably leads to an increase in the discharge surface. As a result, the concentration of ions and free radicals in the spatial vicinity of the surface produced in this way is increased and thus contributes to increased reaction of the hydrogen-containing compounds present in the gas stream. In addition, such spheres or pellets can advantageously lead to a further improvement of the flow or mixing conditions, i.e. lead to a very uniform gas distribution in the discharge or reaction region.

Spheres or pellets used here can advantageously comprise a support material selected from the group consisting of aluminum oxide, titanium oxide, zirconium oxide, cerium oxide, silicon dioxide, magnesium oxide and mixed oxides thereof. Preference is given to silicon oxide pellets (glass pellets).

When spheres or pellets are referred to below, this includes particles, powders or pulverulent substances or other particle size states. The diameters can vary in the range from 100 nm to 10 mm, preferably from 10 µm to 0.5 mm.

The electrodes of the plasma reactor can be configured as flat structures aligned parallel to one another or can form a coaxial arrangement with a central electrode which is surrounded by a tubular electrode and is preferably configured as a shell-and-tube heat exchanger. To aid the formation of discharges, spatial inhomogeneities can be provided, for example by means of helical electrodes which lead to large local field increases and thus to improved formation of the discharge (ignition).

In the case of the "discharge hindered on one side", it is possible, as indicated above, for one wall to consist of an electrically insulating material, e.g. fused silica or oxide ceramic, and one reactor wall to consist of an electrically conductive material, e.g. stainless steel. In the case of the "discharge hindered on two sides", both walls generally consist of electrically insulating material (dielectric having a high breakdown voltage). Here, the electrodes should then be provided for the introduction of, for example, the electric energy provided by means of a pulsed DC voltage source.

Furthermore, one or more reactors can be used for generating the gas discharge for the treatment of the tetrahalide to be purified in the process of the invention. If more than one reactor is used, the reactors can be connected in series or in parallel.

As is known per se, the electron energy introduced in a plasma discharge is dependent on the product of pressure p and electrode spacing d (p·d), so that at constant gas pressure particular free-radical reactions can be promoted or suppressed in the plasma simply by means of a change in the geometry of the reactor. In the process of the invention, the product of electrode spacing and pressure should be in the range from 0.01 to 300 mm·bar, preferably from 0.05 to 100 mm·bar, particularly preferably from 0.08 to 0.3 mm·bar, in particular from 0.1 to 0.2 mm·bar.

The discharge can be excited by means of various AC voltages or pulsed voltages of from 1 to $10^6$ V. Furthermore, the shape of the curve of the voltage applied for generating the discharge can, for example but not exclusively, be rectangular, trapezoidal, sinusoidal, triangular, pulsed or made up of pieces of individual voltage-time curves. Furthermore, the production of suitable voltage-time curves can also be effected by Fourier synthesis.

To achieve a high electron density and a very uniform formation of the discharge in the entire discharge space of the reactor, pulse-shaped excitation voltages are particularly useful. The pulse duration in pulsed operation depends on the gas system and is preferably in the range from 10 ns to 1 ms. The voltage amplitudes can be from 10 V to 100 kV, preferably from 100 V to 10 kV, in a micro system. These pulsed DC voltages can be operated and modulated at high repetition rates, for example from 10 MHz in the case of the 10 ns pulse (pulse duty factor=10:1) to low frequencies (10 to 0.01 Hz), for example as "burst functions" to allow the reaction of adsorbed species.

The PRG used in the process of the invention can be made of any electrically and thermally suitable material. Stainless steel in combination with plastics, ceramics and glasses is particularly preferred. Hybrid constructions of various materials are likewise advantageous.

The dielectrically hindered discharge is known to be a transient gas discharge which is made up of filament-like discharges having a short duration. The distance between the electrodes is generally about one millimeter. Both electrodes appropriately comprise metal. A dielectric, e.g. glass or ceramic, can be applied to them or introduced between them. If the reactor wall itself forms one of the two electrodes, i.e. is made of a metallic material, the resulting arrangement is referred to as a "discharge hindered on one side".

Preference is given to a dielectrically hindered discharge having a frequency of from 1 Hz to 100 MHz, particularly preferably from 30 Hz to 1 MHz, very particularly preferably from 50 Hz to 4 kHz; in particular, all values in the range from 1 to 100 kHz are also advantageous.

Furthermore, when a PRG operated at a power of more than about one watt is used, the electrodes present are advantageously cooled by means of a cooling medium. It is in this case advantageous to choose a cooling medium which has a boiling point of from about 20 to 70° C. at about 300 mbar. Thus, a shell-and-tube heat exchanger can be operated, for example, using water as cooling medium.

The phase to be treated is advantageously passed through the discharge zone of the reactor at a flow velocity of from 0.01 to 100 m/s, in particular from about 0.1 to 10 m/s. The exposure time per discharge is preferably from 10 ns to 1 s, i.e. the phase to be treated is preferably present in the discharge zone for a total period of from 1 ms to 10 minutes at STP, particularly preferably from 100 ms to 10 s at STP, in particular 1.1 s at 300 mbar abs.

According to the invention, the treatment of the phase is appropriately carried out at a pressure of from 0.1 mbar to 10 bar abs., preferably from 1 mbar to 2 bar abs., particularly preferably from 100 mbar to 1.5 bar abs., very particularly preferably from 200 mbar to 1 bar abs., in particular from 250 to 500 mbar abs., with the temperature of the phase to be treated preferably being set to from 0 to 200° C., particularly preferably from 10 to 80° C., very particularly preferably from 20 to 60° C., in the case of silicon tetrachloride. In the case of germanium tetrachloride, the corresponding temperature can advantageously also be higher.

Furthermore, nitrogen or another buffer gas which is inert in respect of the purification task, preferably argon, or else helium, xenon or another noble gas or a mixture thereof, can be added to the phase to be treated at one or more points in the process of the invention. In particular, such a gas can advantageously be used for regulating the pressure in the PRG.

In addition, a selected halogen provider, for example chlorine, can also be added in the process of the invention.

In the process of the invention, the phase to be treated can be treated one or more times by means of the dielectrically hindered discharge. The residence time of the gaseous silicon or germanium tetrachloride in the PRG can thus be set in a targeted manner in order to be able to carry out the treatment according to the invention particularly effectively in one cycle or over a plurality of cycles (circulation mode), i.e., for example, two, three or more passages around the circuit.

However, continuous operation in a single pass is generally preferred. In this case, it is advantageous to use apparatuses which allow a sufficient residence time, for example plants in which a plurality of PRGs are connected in series and/or in parallel.

Furthermore, the operation of the process of the invention, particularly in the case of continuous operation, can advantageously be accompanied by analytical measurements in the liquid silicon or germanium tetrachloride fraction, using, for example, the content of methyltrichlorosilane (MTCS) as guide parameter. Here, it is possible, for example but not exclusively, to use the CH, $CH_2$ or $CH_3$ band advantageously for continuous monitoring by means of IR spectroscopy.

In the process of the invention, the phase which has been treated in this way is generally cooled in stages and the purified $SiCl_4$ or $GeCl_4$ fraction is discharged, i.e. the pure product is preferably separated from the treated phase by means of a fractional distillation.

In general, the process of the invention is carried out as follows: the phase to be treated is converted into the gas phase, an inert gas and/or chlorine are/is added if desired, the gas phase is subjected to a dielectrically hindered discharge in a pressure-rated, heatable and/or coolable PRG (4), the treatment is monitored by means of a guide parameter and a fraction consisting of high-purity silicon tetrachloride or germanium tetrachloride is continuously taken off from the treated phase by means of fractional distillation.

The treatment according to the invention of $SiCl_4$ or $GeCl_4$ contaminated by hydrogen compounds can be carried out in various ways:
 DHD treatment of the phase to be purified, i.e. without any further addition.
 DHD treatment in the presence of one or more additives such as hydrogen halide (HX) and/or halogen ($X_2$) (preferably with X=Cl) and/or noble gases (He, Ar, Xe) or nitrogen.
 DHD treatment firstly without additives and then continuation of the treatment in the presence of at least one of the abovementioned additives.

The process of the invention can be carried out particularly advantageously without the addition of a reducing agent.

FIG. 1 shows a preferred embodiment of a plant for carrying out the process of the invention.

Here, the tetrahalide-containing phase (A) to be purified is taken from storage vessel (A) and fed continuously by means of transport unit (2) and vaporizer (3) to the PRG (4) and there subjected to treatment by means of a cold plasma. The starting phase (A) advantageously flows into the discharge or reaction region in the reactor from below, i.e. from the unit (4.1). The $SiCl_4$ phase which has been treated in this way can subsequently be condensed in a condenser (5) and fed via transport unit (6) to an intermediate vessel (7). In the condenser (5), hydrogen chloride gas (B) is generally separated off from the condensate. Furthermore, product from the intermediate vessel (7) can be fed continuously by means of unit (8) into the upper part of a temperature-controlled column (9), with low boilers (C) being discharged via the unit (10) and liquid phase from the column (9) being fed by means of transport unit (11) to the likewise temperature-controlled column (12) for separating off high boilers (D). Gaseous product from column (12) can be condensed continuously in the unit (13) and be conveyed as high-purity product phase by means of unit (14) to the receiver or storage container for product (15).

The decrease in the content of methyltrichlorosilane (MTCS) or methyltrichlorogermane (MTCGe), which can generally be present in an amount of from 1 to 500 ppm by weight in a silicon or germanium tetrachloride to be purified, is preferably used as parameter for determining the effectiveness of the process of the invention. Thus, for example, starting from 133 ppm by weight of MTCS, the methyltrichlorosilane is generally no longer detectable after completion of the DHD treatment even without addition of one of the additional substances mentioned, i.e. its value has been able to be reduced to <1 ppm by weight (detection limit for the FTIR method) or <0.2 ppm by weight (detection limit for the 1H-NMR method).

An $SiCl_4$ phase which has been treated in this way and preferably has an MTCS value as guide parameter of about <1 ppm by weight can then be passed to a separation. The separation can advantageously be effected by means of a fractional distillation, preferably giving high-purity silicon tetrachloride as purified product.

Furthermore, the process of the invention and the apparatus of the invention have an extremely high effectiveness. Thus, silicon or germanium tetrachloride containing methyltrichlorosilane (MTCS) or methyltrichlorogermane (MTCGe) in amounts into the percentage range can be freed completely of this by means of the DHD treatment process of the invention. If trichlorosilane (TCS) or trichlorogermane (TCGe) is additionally present in the $SiCl_4$ or $GeCl_4$ phase to be purified, this can advantageously be removed at the same time.

The present invention is illustrated by the following example without the subject matter claimed being restricted thereby.

Example

In a plant as shown in FIG. 1, the PRG was supplied with 400 kg/h of $SiCl_4$ (contaminated by 10 ppm by weight of methyltrichlorosilane) and the gas phase was treated by means of a cold plasma. The PRG was equipped with 1 200 micro units, cf. FIG. 2, with the tube length of the dielectrics being 1.5 m and the respective internal diameter being 10 mm. The gap was 0.5 mm. The PRG was operated at about 30° C. This resulted in a mean residence time of the gas of 1 s in the reactor at a pressure of about 300 mbar abs. This corresponded to a residence time at STP of about 3 s. The treated gas phase was subsequently fractionally condensed. No methyltrichlorosilane could be detected in the purified $SiCl_4$ product phase obtained in this way.

The invention claimed is:

1. A continuous, industrial process for preparing high-purity silicon tetrachloride or high-purity germanium tetrachloride, comprising:
   vaporizing contaminated silicon tetrachloride or contaminated germanium tetrachloride to obtain a gaseous stream;
   passing the gaseous stream in a flow direction opposite to the force vector of gravity through a plasma reactor;
   treating the contaminated silicon tetrachloride or contaminated germanium tetrachloride with a cold plasma to obtain a purified silicon tetrachloride or purified germanium tetrachloride; and
   isolating the purified silicon tetrachloride or purified germanium tetrachloride by fractional distillation,
   wherein
   the contaminated silicon tetrachloride or contaminated germanium tetrachloride comprises at least one hydrogen containing compound, and
   the plasma reactor comprises as components:
   a dielectric;
   a high voltage electrode; and
   a grounded metallic heat exchanger;
   wherein
   the dielectric is mechanically self-stabilized by an arrangement in which longitudinal axes of the dielectric, of the high-voltage electrode and of the grounded, metallic heat exchanger are oriented parallel to one another and at the same time parallel to the force vector of gravity.

2. The process as claimed in claim 1,
wherein
the cold plasma is generated by a dielectrically hindered discharge.

3. The process as claimed in claim 1,
wherein
the plasma reactor is for gas-phase treatment with a discharge space that is tubular and free of stands.

4. The process as claimed in claim 1,
wherein
the plasma reactor is for gas-phase treatment and the dielectric is a tubular dielectric standing area on a perforated plate, a grid or a mesh, with a phase to be treated flowing through the perforated standing area and subsequently passing through a reaction region between the dielectric and the electrode.

5. The process as claimed in claim 1,
wherein
two or more plasma reactors are operated in series or in parallel.

6. The process as claimed in claim 2,
wherein
the dielectrically hindered discharge is produced by an AC voltage or pulsed voltage of from 1 V to $1 \times 10^6$ V.

7. The process as claimed in claim 2,
wherein
the dielectrically hindered discharge is operated at a frequency of from 1 Hz to 30 GHz.

8. The process as claimed in claim 2,
wherein
exposure time per discharge is from 10 ns to 1 ms.

9. The process as claimed in claim 2,
wherein
the silicon tetrachloride or germanium tetrachloride to be treated passes through a discharge zone at a flow velocity of from 0.01 to 100 m/s.

10. The process as claimed in claim 9,
wherein
residence time of the silicon tetrachloride or germanium tetrachloride in the discharge zone is set to from 1 ms to 10 minutes.

11. The process as claimed in claim 2,
wherein
the dielectrically hindered discharge is operated at a temperature of gas phase of from 0° C. to 200° C.

12. The process as claimed in claim 1, wherein
a noble gas, nitrogen, or an inert buffer gas or a mixture of these gases is added to the phase to be treated at one or more points in the process.

13. The process as claimed in claim 1, wherein
chlorine and/or hydrogen chloride are/is added to the phase to be treated.

14. The process as claimed in claim 1, wherein
the treating is carried out at a pressure of from 0.1 mbar to 10 bar abs., with the temperature of the phase to be treated being set to from 0° C. to 200° C.

15. The process as claimed in claim 1, wherein
the phase to be treated is converted into gas phase,
an inert gas, chlorine or a mixture of inert gas and chlorine are optionally added,
the gas phase is subjected to a dielectrically hindered discharge in a pressure-rated, reactor, which is capable of being heated, cooled or both heated and cooled,
the treating is monitored by a guide parameter, and
a fraction consisting of high-purity silicon tetrachloride or germanium tetrachloride is continuously taken off from the treated phase by fractional distillation.

16. The process as claimed in claim 1, wherein contaminated silicon tetrachloride is vaporized and treated and purified silicon tetrachloride is isolated.

17. The process as claimed in claim 1, wherein contaminated germanium tetrachloride is vaporized and treated and purified germanium tetrachloride is isolated.

* * * * *